(12) United States Patent
Pyle

(10) Patent No.: US 9,684,526 B2
(45) Date of Patent: Jun. 20, 2017

(54) TECHNIQUES FOR CONFIGURING A GENERIC PROGRAM USING CONTROLS

(71) Applicant: Ab Initio Software LLC, Lexington, MA (US)

(72) Inventor: Hugh F. Pyle, Salem, MA (US)

(73) Assignee: Ab Initio Technology LLC, Lexington, MA (US)

( * ) Notice: Subject to any disclaimer, the term of this patent is extended or adjusted under 35 U.S.C. 154(b) by 0 days.

(21) Appl. No.: 14/714,037

(22) Filed: May 15, 2015

(65) Prior Publication Data

US 2016/0335100 A1 Nov. 17, 2016

(51) Int. Cl.
  *G06F 3/048* (2013.01)
  *G06F 9/445* (2006.01)
  *G06F 17/24* (2006.01)
  *G06T 11/20* (2006.01)
  *G06F 3/0484* (2013.01)
  *G06F 3/0482* (2013.01)
  *G06F 9/44* (2006.01)

(52) U.S. Cl.
  CPC ........ *G06F 9/44505* (2013.01); *G06F 3/0482* (2013.01); *G06F 3/04842* (2013.01); *G06F 3/04847* (2013.01); *G06F 8/38* (2013.01); *G06F 17/248* (2013.01); *G06T 11/206* (2013.01)

(58) Field of Classification Search
  CPC ............... G06F 7/78; G06F 8/00–8/78; G06F 9/44–9/455; G06F 11/36
  See application file for complete search history.

(56) References Cited

U.S. PATENT DOCUMENTS 6,292,187 B1 * 9/2001 Gibbs ................ H04N 5/44513
  348/E5.006
7,296,194 B1 * 11/2007 Lovy .................... G06F 11/0709
  709/224
2002/0174420 A1  11/2002 Kumar
(Continued)

OTHER PUBLICATIONS

Rauf et al., Automated GUI Test Coverage Analysis using GA, 2010.*
(Continued)

*Primary Examiner* — H. S. Sough
*Assistant Examiner* — Zhan Chen
(74) *Attorney, Agent, or Firm* — Wolf, Greenfield & Sacks, P.C.

(57) ABSTRACT

According to some aspects, a method of operating a data processing system is provided wherein at least one computer program is configured, the data processing system comprising least a first control, a second control and a third control, the first, second and third controls comprising at least user interface portions and operational portions, the method comprising rendering a first user interface based on the user interface portion of the first control, receiving first user input through the first user interface, the first user input providing configuration information for the at least one program, identifying the second control based at least in part on the operational portion of the first control, rendering a second user interface based on the user interface portion of the identified second control, and receiving second user input through the second user interface, the second user input providing configuration information for the at least one program.

23 Claims, 7 Drawing Sheets

(56) References Cited

U.S. PATENT DOCUMENTS

| | | |
|---|---|---|
| 2007/0234274 A1 | 10/2007 | Ross et al. |
| 2009/0225082 A1* | 9/2009 | Hargrove .............. G06T 11/206 |
| | | 345/440 |
| 2010/0064229 A1* | 3/2010 | Lau ................... G06F 17/30893 |
| | | 715/744 |
| 2013/0247006 A1 | 9/2013 | Trowbridge |
| 2014/0365020 A1 | 12/2014 | Brusilovsky |
| 2015/0106303 A1* | 4/2015 | Abadi ...................... G06N 5/02 |
| | | 706/11 |

OTHER PUBLICATIONS

Ganov et al., Test Generation for Graphic User Interfaces Based on Symbolic Execution, 2008.*
PCT/US2016/032439, Jul. 22, 2016, International Search Report and Written Opinion.
International Search Report and Written Opinion for Application No. PCT/US2016/032439, mailed Jul. 22, 2016.

* cited by examiner

TECHNIQUES FOR CONFIGURING A GENERIC PROGRAM USING CONTROLS

BACKGROUND

An executable program, such as a dataflow graph, may include one or more parameters that configure aspects of the execution of the program. For example, a program that reads a data file may include a parameter for which a value may be supplied to indicate a location where the data file is stored. Before the program is executed, a value for the parameter may be supplied such that a specified location is accessed to read the data file. The same program may be executed again while reading a different data file by a user supplying a different value of the parameter when executing the program a second time.

Some executable programs may be written to generically specify a task and then configured by "parameterizing" to perform the task for a given scenario. "Parameterizing" the program entails supplying values for parameters to the program that correspond to the scenario. Such a program is sometimes referred to as a "generic program." For example, a generic program for sorting a data file may be parameterized by an input file location, an output file location, a record format for the data and a sort key. By supplying suitable values for these parameters, the generic program may be executed in any instance in which sorting data and saving the results to a file is desired.

A generic program may be parameterized by use of a user interface that allows a user to specify appropriate values for parameters of the generic program. In some cases, a user who parameterizes the generic program may be different from a user who writes the generic program. For example, the creation of a generic program may require a higher level of technical skill than selection of parameters to execute the generic program.

SUMMARY

According to some aspects, a method of operating a data processing system is provided, wherein at least one computer program is configured via a user interface defined at least in part according to a configuration template, the data processing system comprising execution time data and at least a first configuration control, a second configuration control and a third configuration control, the first, second and third configuration controls comprising at least user interface portions and operational portions, the method comprising rendering a first user interface based on the user interface portion of the first configuration control, receiving first user input through the first user interface, the first user input providing configuration information for an instance of the at least one program, identifying the second configuration control based at least in part on evaluating at least part of the operational portion of the first configuration control, said evaluation being based at least in part on the execution time data, rendering a second user interface based on the user interface portion of the identified second configuration control, and receiving second user input through the second user interface, the second user input providing configuration information for the instance of the at least one program.

According to some aspects, a method of defining an interface for configuring at least one computer program is provided, comprising with a computing system, and based at least in part on user input, associating a first configuration control with the interface, the first configuration control comprising at least an operational portion and a user interface portion that defines a first user interface, the first configuration control configured to define configuration information for the at least one program based at least in part on user input received through the first user interface, associating a second configuration control with the interface, the second configuration control comprising at least an operational portion and a user interface portion that defines a second user interface, the second configuration control configured to define configuration information for the at least one program based at least in part on user input received through the second user interface, and recording data that, based at least in part upon execution time data, defines at least one instance in which the user input received through the first user interface is to cause rendering of the second user interface.

According to some aspects, at least one computer readable medium is provided comprising instructions that, when executed, cause a computer to perform a method of configuring a computer program, the method comprising recording the program based on information received through a first user interface, the program accepting one or more configuration parameters, recording a specification for a user interface for configuring the program based on information received through a second user interface by selecting a plurality of configuration controls, each configuration control comprising a user interface element, recording a mapping between the user interface elements of the selected configuration controls and configuration parameters of the one or more configuration parameters, and recording a conditional order of rendering of the user interface elements of at least a portion of the plurality of configuration controls, and configuring the program using a configuration user interface by rendering a user interface element in the configuration user interface associated with a first of the plurality of configuration controls, receiving user input via the user interface element of the first configuration control, and storing a value of at least one configuration parameter based at least in part on the user input and the mapping, and modifying the configuration user interface based on a user interface element of a second configuration control of the plurality of configuration controls, the second configuration control being selected based at least in part on the user input.

The foregoing is a non-limiting summary of the invention, which is defined by the attached claims.

BRIEF DESCRIPTION OF DRAWINGS

Various aspects and embodiments will be described with reference to the following figures. It should be appreciated that the figures are not necessarily drawn to scale. In the drawings, each identical or nearly identical component that is illustrated in various figures is represented by a like numeral. For purposes of clarity, not every component may be labeled in every drawing.

DETAILED DESCRIPTION

Figure 1:
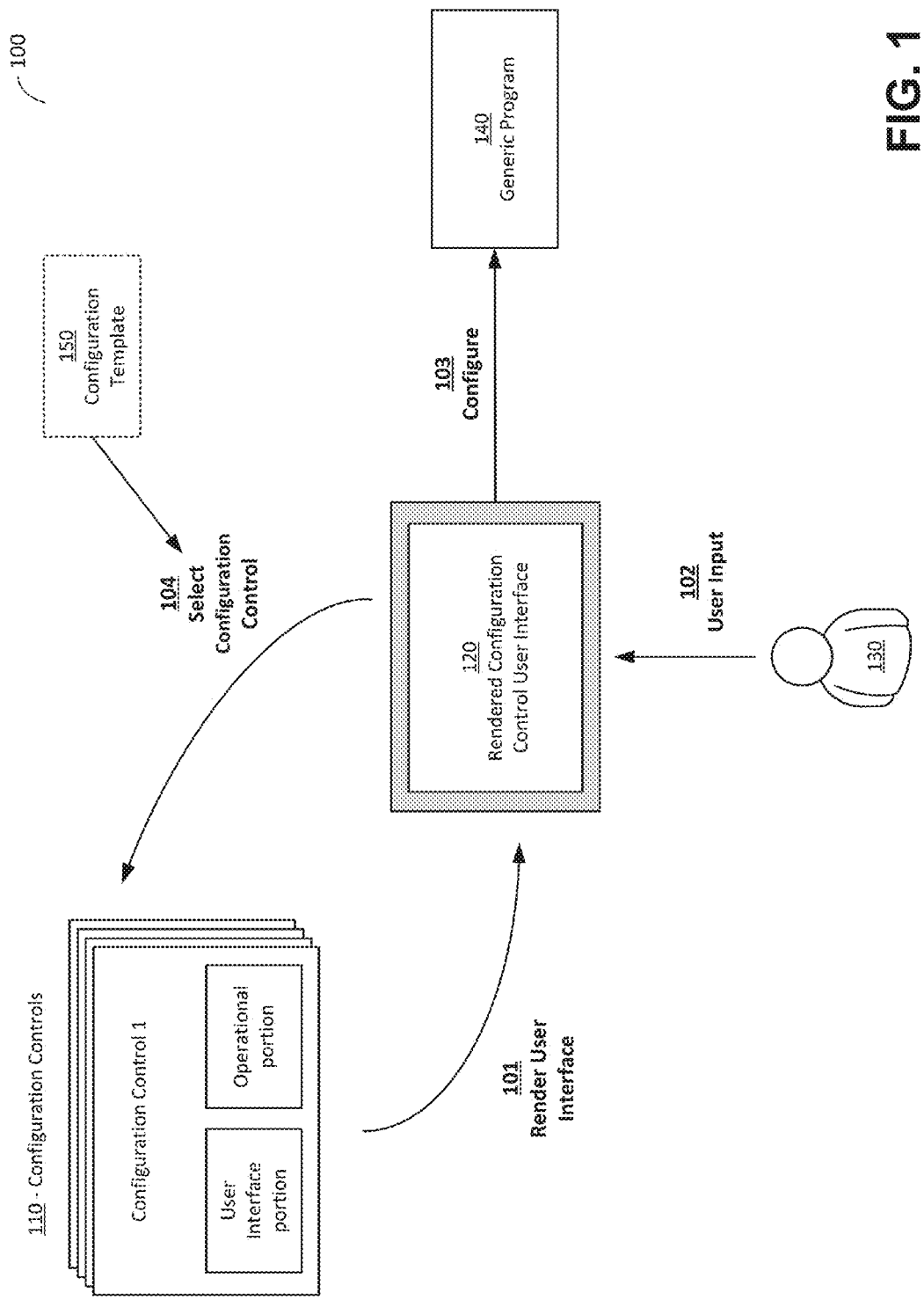
FIG. 1 depicts an illustrative process for configuring a generic program using one or more configuration controls, according to some embodiments.

The inventors have recognized and appreciated that the efficiency of data processing systems, and other systems that are controlled by complex programs, may be improved by techniques to simplify the parameterization of those complex programs. Such efficiency may be achieved by techniques that enable different people, with different skill sets, to provide different types of inputs at different times. A skilled programmer, for example, may define interactions between a computerized system that will execute the program and one or more data stores. These interactions may be captured as a generic program. To make the generic program fully useful within an enterprise, another user familiar with requirements of the business, such as a business analyst, may specify values of parameters used in execution of the program. For example, the business analyst may specify values of parameters such as which data source(s) are accessed, which fields within a data source are accessed, how to sort data accessed from the data source, and/or one or more transformations to be performed with respect to the data.

However, a business analyst may lack detailed knowledge of programming that would otherwise enable the business analyst to write the program to implement the desired business logic. Accordingly, in some scenarios, a programmer may write the program in a generic way, so that it can work in any of multiple scenarios. That program may have multiple configuration parameters such that, when values are specified for the configuration parameters, the program otherwise executes to perform operations customized for a particular scenario. For example, the appropriate data source may be accessed based on a value of a parameter specifying the data source location.

A business analyst, or other user of the program, may specify values of the configuration parameters for a given scenario, such as by accessing a suitable user interface. In this way, a business analyst, or other person who may not be familiar with programming, can configure the program for a specific business scenario. In some embodiments, a template for the program may be defined to enable a business analyst to easily enter values of configuration parameters. The template may be created by a programmer familiar with the details of the generic program and may supply a mapping between values input by a user (e.g., the business analyst) and parameters of the program. To aid a business analyst in inputting values to control the program in a desired way, the template may contain information indicating what each parameter controls such that the business analyst does not require detailed knowledge of operation of the program to provide values of the parameters that configure the program to perform desired functions. These aspects and/or other aspects of the template may be presented to the business analyst via a user interface, which may at least in part be defined by the template.

To simplify the generation of a template and to provide a more intuitive interface through which the analyst may provide values of configuration parameters, the template may dynamically generate aspects of the interface that are presented to the analyst based on separately defined configuration controls. The configuration controls may be defined by the programmer, for example. Alternatively, the set of configuration controls may include predefined and/or custom controls. In some embodiments, for example, the template may dynamically present user interface elements to the user. Each user interface element may be associated with a configuration control that associates one or more values input by a user through the interface with configuration parameters of a program. In some embodiments, a set of configuration controls may consist of predefined controls such that the "template" that organizes user input to configure the program may be generated by selecting the set of predefined controls.

As used herein, configuration controls may refer to a set of instructions or other information that, when invoked, controls execution of a computer. These configuration controls may be programmed without relying on information about the programs that they may be used to configure. These configuration controls may be reusable such that different templates, which may define different configuration processes for different generic programs, may make use of the same controls in the different scenarios. Particular configuration activities may be frequently performed (e.g., selecting a file) and accordingly "common" configuration controls (or simply "common controls") may be defined such that they may be used in any suitable scenario in which the associated configuration activity is to be performed. In this way, common controls may modularize the definition of at least part of a configuration process defined by a template.

According to some embodiments, configuration data may be used in conjunction with configuration controls to enable configuration of a generic program despite complexities that may arise from using configuration controls to configure a generic program. For example, the range of values that are appropriate for one parameter of a generic program may depend on the value specified for one or more other parameters of the program. Likewise, the parameters for which values are required to configure the program may depend on values specified for other parameters. For example, a generic program may read a data file and then perform an action using the data. A generic program may be configured to parameterize the data file location, but using a fixed set of parameters relating to other aspects of the data file, such as a record format for a flat file, a schema for an XML document, etc. may limit how the program can be configured for execution. Providing a parameter for specifying a record format, for example, may be necessary when the data file is a flat file, but irrelevant or even incorrect when the data file is an XML document. As another example, specifying a data source that has three fields per record may result in a different range of possible values for a parameter that specifies a field on which to operate than if the value for the parameter specifying the data source indicates a data source with ten data fields. Alternatively, if the value of a parameter indicates that the program should bypass a portion of a program that compares a result to stored data, there may be no reason to solicit user input specifying a source of stored data.

Accordingly, in conjunction with specifying a set of configuration controls to be used in generating a user interface though which values of configuration parameters are obtained, configuration data may be recorded. This configuration data may indicate things such as which configuration controls are used to request values of input parameters and/or the order in which those configuration controls are used to request values of input parameters, may be specified. This order of execution may be conditional, and may be based on inputs received from the user, such as values of configuration parameters previously received through other configuration controls. Likewise, the user interface elements may be configured based on values previously received.

According to some embodiments, a configuration control may evaluate one or more parameters, variables, arguments and/or execute one or more programs based on execution time data. A data processing system presenting the configuration control to a user may include data defined at execution time (e.g., by environment parameters, data file(s) and/or executable program(s)), and the configuration control may be configured to evaluate one or more parameters, variables, arguments and/or execute one or more programs based on such execution time data. Each configuration control may have its own scope such that a named parameter evaluated within one instance of a configuration control may evaluate to a different result than the same named parameter when evaluated in another instance of the same configuration control. For example, a configuration control may include a configuration parameter whose value is expressed as a function of an environment variable. When the configuration control evaluates the configuration parameter, it determines the current value of the environment variable and evaluates the configuration parameter accordingly. If the same configuration control is subsequently used in a different part of the same configuration process (i.e., in configuring the same instance of the same generic program), the configuration parameter in each case may be evaluated within its own scope and may therefore evaluate to a different value in each case. A configuration parameter may be expressed as a function of other parameters within the same configuration control, and/or of other parameters within a configuration template.

Accordingly, aspects of the technology described herein relate to the use of configuration controls that may be combined to produce a configuration interface. The inventors have recognized that a dynamic interface for configuring a generic program may be efficiently provided by building the interface using configuration controls that may provide interface elements in addition to operational logic. The operational logic may include static or dynamic (e.g., executable) code that, when evaluated, may determine how to present and/or adapt the configuration interface. Those adaptations may involve, for example, initializing and/or updating a user interface presented by the configuration interface. Alternatively or additionally, those adaptations may include other tasks such as validating input provided by a user to the configuration interface.

Furthermore, values input by a user to a configuration control may be mapped to appropriate parameters of the generic program based on the context provided by the control. Such a mapping may be specified by an "adapter" that links values collected through a user interface element of a configuration control to specific parameters of a generic program. As discussed above, "common" configuration controls may represent reusable interface components that have broad applicability to a range of program configuration tasks, and an adapter may support such use. However, there is no requirement that the configuration controls all be generic or reusable, as some embodiments may utilize configuration controls that perform fixed functionality.

As an illustrative example, an interface to configure a generic program may be generated with a configuration control associated with a user interface element that provides a file selection interface. Additional configuration controls may be available that provide interfaces for tasks associated with selecting a file, such as the selection of a record format and for the selection of an XML schema for the selected file. A user may select a file using the user interface element of the first configuration control, which then executes logic based on the user input to determine the type of file that was selected. Based on the type of file, one of the additional configuration controls may be selected and then presented so that a user may provide further configuration information according to the file type (e.g., selecting the record format in the case of a flat file or selecting an XML schema in the case of an XML document). In this way, the generic program may be configured using a dynamically chosen set of parameter values, which provides greater flexibility in how a generic program may be configured by a user.

According to some embodiments, a configuration control may specify, at least in part, a subsequent configuration control to present within a user interface. For instance, in the above example, the file selection configuration control may identify a configuration control presented to a user to select a record format. The initial configuration control may, for example, execute logic (or cause logic to be executed) that identifies the subsequent configuration control to be presented. This identification of a configuration control based on dynamically determined conditions may be done in any suitable way, such as by accessing a lookup file, executing a program, etc., such that the subsequent configuration control is identified.

In some embodiments, a "wizard" may be provided in conjunction with a program. The wizard may be a program that generates a user interface by selecting a sequence of configuration controls. The wizard may successively present on a display, or other user interface mechanism, pages defined, at least in part, by selected configuration controls. The wizard may be encoded with or may access configuration data from which the wizard, when executed, may dynamically determine an order of execution of selected controls. The order of the pages may be selected prior to presentation to a user and/or may be dynamically selected based on user input or other events that may occur during presentation of the sequence. For example, the order of the pages may depend on values received through the user interface. Likewise, the user interface element may be customized based on values received. According to some embodiments, a configuration control may be selected based at least in part on logic executed by a wizard and on input provided to a configuration control being presented by the wizard. For instance, a wizard may provide navigational elements in a user interface (e.g., in the form of directional buttons) that, when activated by a user, execute logic that identifies a configuration control based on the activated navigational element and on input provided to a configuration control being presented by the wizard. This may, for example, allow a wizard to successively present configuration controls that are chosen based on logic executed by previously presented configuration controls. The wizard may include any number of configuration controls and/or any number of other controls defined by the wizard.

According to some embodiments, a wizard may present a configuration interface based on any number of configuration controls and/or any number of other controls defined by the wizard. For instance, a wizard may present a portion of a user interface defined by a configuration control and additional user interface elements that provide on the configuration interface navigational elements that, when activated by a user, enable the user to step forward and/or backward though a sequence of pages presented by the wizard. These navigational elements may be presented by the wizard distinct from the presentation of elements from a configuration control. Further, a user may interact with such presented elements (e.g., navigational elements) to perform additional functions other than those provided by a presented configuration control.

Following below are more detailed descriptions of various concepts related to, and embodiments of, configuring a generic program using dynamically selected configuration controls. It should be appreciated that various aspects described herein may be implemented in any of numerous ways. Examples of specific implementations are provided herein for illustrative purposes only. In addition, the various aspects described in the embodiments below may be used alone or in any combination, and are not limited to the combinations explicitly described herein. Configuration controls as described herein may include "compound controls" as described in U.S. patent application Ser. No. 14/192,184, titled "Compound Controls" and filed on Feb. 27, 2014, which is incorporated herein by reference.

As discussed above, configuration controls may be used to dynamically generate an interface to configure a generic program. FIG. 1 schematically illustrates a process in which a user configures a generic program using one or more configuration controls which are presented by a system having a user interface, according to some embodiments. Selection and presentation of configuration controls in method 100 may be performed by one or more systems with which a user may interface via user commands, actions, etc.

In method 100, a configuration control is selected from a set of configuration controls 110 and presented to a user in order for a computing system to present a user interface through which the user 130 may configure a generic program 140. A suitable system may select the configuration control from the set of configuration controls 110 in a whole or in part based on logic provided by the configuration template 150, to be described below. As used herein, "presentation" of a configuration control may include rendering all or portions of user interface 120 to the user based on the configuration control.

The user may interact with the rendered user interface to provide configuration information for the generic program. The selection of the configuration control is determined based on a configuration template 150 which, as discussed above, may have previously been defined (e.g., by a technical user) to make configuration of a generic program easier for a user (e.g., a business user). The configuration template may define a sequence of controls to be used for configuration of generic program 140, which may include one or more of the configuration controls 110. The selection of a configuration control may be dynamically performed based on the configuration template, user input provided to a currently selected configuration control and/or other configuration control(s), one or more lookup files, any other suitable factors, or combinations thereof.

In the example of FIG. 1, a set of configuration controls 110 are available for dynamic generation of an interface to configure a generic program. The configuration controls may include a user interface portion and an operational portion. A user interface portion of a configuration control may define, in any suitable way, how the computer system executing the control will render a user interface when presenting the configuration control. The operational portion may be associated with one or more parameters, variables or arguments and/or one or more programs that provide functionality for the user interface or otherwise. Such association may be by including these aspects (e.g., parameters) within the operational portion and/or by linking to parameters that are stored elsewhere. For example, the operational portion may include a pointer to a program (or may include the program itself) configured to perform validation of data entered into the rendered configuration control user interface. The user interface portion and operational portions of a configuration control are discussed in further detail below in relation to FIG. 2.

In act 101 of method 100, a computing system with which user 130 interacts renders a user interface based on the user interface portion of the currently selected configuration control. The user interface may include any number of any type of user interface elements, such as but not limited to, text boxes, buttons, sliders, list boxes, drop-down lists, menus, toolbars, icons, tree views, labels, etc. As is known in the art, a computing system may render graphical representations of such elements on a display. A user may provide one or more inputs, such as a mouse movement, a mouse click, a key stroke, etc. correlated with the displayed element such that the computer system will associate that user input with a specific meaning defined by programming of the control. The user interface elements and how to render them (e.g., their layout) may be defined by the user interface portion of the currently selected configuration control in any suitable way.

According to some embodiments, one or more of the user interface elements of the rendered configuration control user interface 120 may be populated with data based at least in part on the operational portion of the currently selected configuration control. For example, the operational portion may define values available for selection within one or more user interface elements of the rendered configuration control. Such values may be static values stored with the configuration control, and/or may be dynamically determined (e.g., by executing one or more programs or otherwise executing logic of the operational portion of the configuration control). Accordingly, the visual look and feel of the rendered configuration control user interface 120 may be defined by the user interface portion of the currently selected configuration control, whereas at least some data values available for selection within the rendered configuration control user interface may be defined by the programming of the operational portion of the currently selected configuration control.

According to some embodiments, the operational portion of a configuration control may determine initial behavior of the rendered user interface of the configuration control, and/or may determine reactive behavior of the rendered user interface. Initial behavior may include defining values available for selection within one or more user interface elements of the rendered configuration control, as discussed above. For instance, a system presenting a configuration control may define selectable values of user interface elements of the configuration control based on the operational portion of the configuration control. Reactive behavior may include updating values for selection within one or more user interface elements of the rendered user interface 120, performing validity checks, populating fields of the user interface, showing and/or hiding user interface elements, etc., any of which may be based at least in part on user input 102 provided to the rendered user interface. For example, a rendered configuration control may include a user interface element to select a file. Once the file has been selected, a program of the configuration control's operational portion may be executed that checks the file is readable, that the path is valid, and produces a preview of the contents of the file for display in another user interface element of the configuration control. In some cases, parameters and/or executable code, which may be static and/or dynamic, that are associated with the operational portion of a configuration control may be evaluated multiple times as a user interacts with the rendered configuration control (e.g., if the user then selects a different file in the above example).

A system may determine configuration values to be applied to the generic program 140 being configured based on user input 102. For example, the user may enter values via one or more user interface elements. These values may be directly used to populate parameters of the generic program 140, such as by assigning values typed by the user to the parameters. Alternatively, or additionally, the user may interact with user interface elements that have implied values, such as buttons or sliders, wherein the implied values are assigned to parameters of the generic program 140. Alternatively, the values may be modified based on the operational portion of the currently rendered configuration control before being supplied to the generic program.

According to some embodiments, an adapter may provide mappings between values provided via user input to the currently rendered configuration control user interface and parameters of the generic program. An adapter may be defined in conjunction with the configuration template, for example, by a technical user who also defines the configuration template itself. The adapter may be, for example, stored as part of generic program 140, stored as part of configuration template 150, and/or may be stored as a separate component not shown in the figure. An adapter may allow reuse of the same configuration control for different aspects of a configuration process since the adapter may map the same parameter within two copies of the same configuration control to different parameters of the generic program during each use of the configuration control during configuration. Accordingly, the adapter may generally be defined in conjunction with the configuration template since the configuration controls identified by the configuration template have a dependency upon the way the adapter utilizes them to define values of parameters of the generic program being configured.

As one non-limiting example of use of an adapter, a configuration control being presented may use a first parameter name for a data field within its user interface, whereas this value is to be mapped to a parameter within the generic program having a different parameter name. The adapter may have been configured such that it maps the value of the configuration control's first parameter to the generic program's parameter when a value is provided by a user. In this way, an adapter may allow reuse of the same configuration control for different aspects of a configuration process since the adapter may map the same parameter within two copies of the same configuration control to different parameters of the generic program during each use of the configuration control during configuration.

In act 104, a further configuration control is selected for presentation from configuration controls 110. The configuration control selected may be the same configuration control as was previously presented (i.e., by rendering the configuration control's user interface as described above) or may be a different configuration control. Configuration template 150 and/or the initial configuration control may, at least in part, determine which configuration control is selected for presentation. The configuration template may indicate an ordered sequence of configuration controls to be presented, and/or may include logic for dynamically determining a configuration control to be presented. Additionally, or alternatively, a presented configuration control may be selected based at least in part on aspects of the operational portion of the initially presented configuration control. According to some embodiments, a configuration control may include a parameter that identifies a subsequent configuration control to present. Such a parameter may be static (e.g., stored with the configuration control with a fixed value) or dynamic (e.g., may execute logic that results in a value identifying a subsequent configuration control to present. A dynamic parameter may execute such logic at least in part by accessing a lookup file, which may for example be defined and/or stored with the configuration template 150.

According to some embodiments, selecting a configuration control for presentation may be based upon data provided via user input to any number of previously rendered configuration controls. As an example, a first configuration control may be presented in which a user provides input to select a data file. The configuration template and/or executable logic within the first configuration control may then identify a second configuration control to present based on the provided input (e.g., based on the file's location in a file system, based on the file type, its extension, etc.).

According to some embodiments, a configuration control may include one or more values that are defined based on configuration template 150. The configuration control may include one or more references to values to be defined by a configuration template that resolve to said values based on the configuration template in use. For example, a number of configuration controls may include a parameter defined in the same way to have the value of a parameter "company_name" (and which, for example, may be displayed within a user interface rendered based on any of those configuration controls). By defining a value of "company_name" within the configuration template, each of the configuration controls, when used to render a user interface, may display the value in the user interface. This may be performed, for example, by passing the value of "company_name" defined in the configuration template to the parameter whose value depends on "company_name" within a configuration control.

As discussed above, information defining the configuration process may be stored and then accessed by the system to select controls at various stages in the configuration process and provide data values that are used, as the selected controls are used, such as to change options presented in display elements or to change the manner in which user input alters the process. In some embodiments, that information may be stored as a "template." A configuration template may be developed for the particular generic program 140 being configured. For example, a programmer defining the generic program 140 may also define the configuration template 150 so that a business analyst configuring the generic program may utilize controls defined by the configuration template (including any number of configuration controls) to provide configuration information for the generic program. As discussed above, the configuration template may include, and/or may be associated with, logic to dynamically determine a configuration control based on one or more factors. Thus, a dynamically generated interface for configuring the generic program may be presented to a user.

According to some embodiments, a system may access one or more lookup files to identify a subsequent configuration control to present, which may for example be performed based on data provided within the configuration template and/or within another configuration control (e.g., one currently being presented). A lookup file may include any number of indexes such that a configuration template may provide one or values to the lookup and in response receive an indication of a configuration control to subsequently present. For example, where a user provides a file name to a first presented configuration control, the file name, some aspect of the file name (e.g., the extension) and/or information derived from the file name (e.g., the file type, a size of the file, etc.) may be used to perform a lookup of one or more lookup files. A result of the lookup(s) may identify a subsequent configuration control to present. Using one or more lookups to identify a configuration control for presentation may have an advantage that the logic to make such an identification may be stored separately from the configuration template. For example, the configuration template may be associated with one or more lookup files that dictate logic for identifying configuration controls during a configuration process, and accordingly the logic may be changed without modification of the configuration template, but rather only by modifying values within the lookup file(s).

Once a user has provided suitable configuration information via a presented configuration control, an indication that a new configuration control should be identified may be provided in any suitable way. According to some embodiments, user interface elements indicating steps in the configuration process of the generic program may be rendered such that the user may proceed to a subsequent step and/or return to a preceding step, by activating such an element. For example, where configuration controls are presented via a wizard, the wizard may present a configuration control and in addition provide buttons to move forward and backwards through the configuration process. When a user activates the "forward" button, the system may respond by executing logic to identify another configuration control and present the configuration control via the techniques discussed above. Alternatively, the logic may be executed prior to activation of the button such that, once the button is activated, the system may promptly present the subsequent configuration control.

Figure 2:
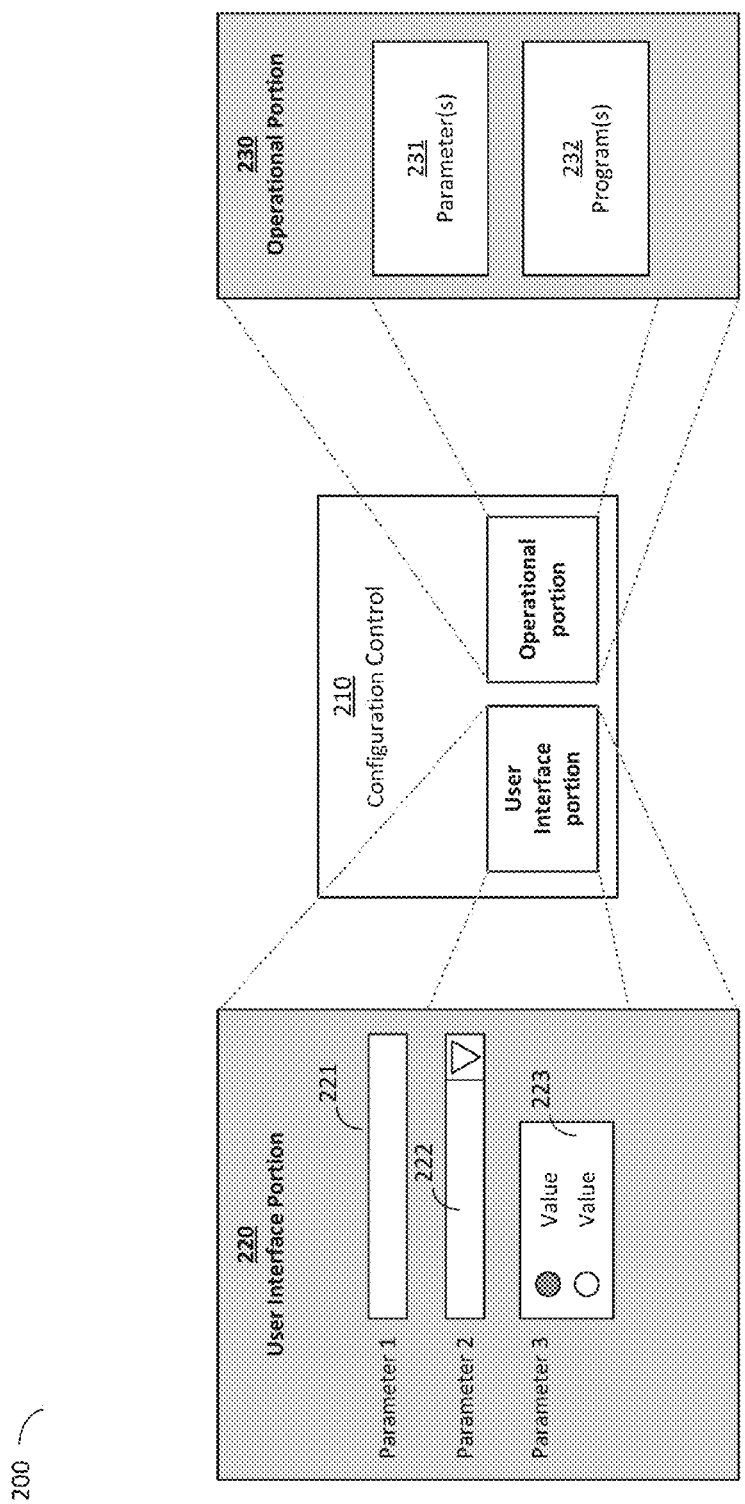
FIG. 2 depicts illustrative components of a configuration control, according to some embodiments.

FIG. 2 depicts illustrative components of a configuration control, according to some embodiments. As discussed above, a configuration control (including a common control) may include a user interface portion and an operational portion. It will be appreciated that, while FIG. 2 shows these portions graphically, these portions may be implemented by computer executable instructions and data, or indications of where data is to be obtained, while the portion is being executed or otherwise evaluated. In the example of FIG. 2, configuration control 210 includes a user interface portion 220 and operational portion 230. The user interface portion 220 defines three illustrative user interface elements 221, 222 and 223, which are a text box, a drop-down list and a pair of radio buttons, respectively. As discussed above, user interface elements defined by a user interface portion of a configuration control may be rendered within a user interface and displayed to a user, who may provide user input to one or more of these elements. An association between values of these user interface elements and parameters of a generic program may have previously been established (e.g., via an adapter as discussed above). As a result, by providing user input to the user interface elements 221, 222 and 223, a user may provide configuration information to the generic program.

In the example of FIG. 2, operational portion 230 defines one or more parameters 231 and is associated with one or more programs 232. As discussed above, in general an operational portion of a configuration control may include any number of parameters and/or programs (including zero of either of these types of elements). Programs 232 may include any executable logic, such as, but not limited to, scripts, declarative statements and/or expressions, dataflow graphs and/or dataflow subgraphs, and operational portion 230 of configuration control 210 may store any number of such programs with the configuration control and/or may include a pointer to any number of such programs. When configuration control 210 is presented by a suitable application, any one or more of programs 232 may be executed within that application or as a separate process, as the invention is not limited to any particular method in which executable logic may be executed as part of a configuration control. For example, program(s) 232 may include an expression to be executed by the application presenting the configuration control 210.

According to some embodiments, program(s) 232 may include executable logic that checks the validity of user input to one or more user interface elements of the rendered configuration control user interface. For example, a user interface element may have restrictions on the type of data that may be entered, such as by restricting the range of values that may be validly entered, or by limiting the types of characters that may be entered (e.g., prohibiting spaces for a file path value). Program(s) 232 may thereby include executable logic that, in response to user input to the rendered configuration control user interface, determines the validity of contents of one or more user interface elements of the user interface. Where content is determined to be invalid, an indication may be provided to the user interface to visually or otherwise alert the user as to the invalid content. In some cases, executable logic present in the operational portion 230 may produce a message to aid the user in providing valid content and provide the message to the user interface for presentation to the user.

Operational portion 230 may define one or more parameters 231. Parameter definitions may include, for example, a listing of parameter names and may, in some cases, include default values for those parameters. Parameter(s) 231 may include any number of static parameters and/or parameters whose values that are determined dynamically based on executable logic which may be included within the parameter expression, within program(s) 232 and/or may be obtained from another location. According to some embodiments, parameter(s) 231 include one or more parameters expressed by an interpreted parameter definition language. These parameter expressions may be evaluated when presenting configuration control 210 or otherwise such that the statement resolves to a parameter value. For example, a parameter may be defined that so that it evaluates to "A" when a particular data file exists, and evaluates to "B" when the data file does not exist.

Parameter(s) 231 may include values utilized by any executable logic of the program(s) 232. These variables may allow the executable logic associated with the configuration control 210 to be reused in other configuration controls, since changing the value or one or more of these variables may thereby change the behavior of the same executable logic. For example, two different configuration controls may be associated with the same program via their respective operational portions. The program may, in operation, reference a parameter value of a respective configuration control (e.g., by referencing a name of the parameter). By utilizing different values of the parameter in each of the two configuration controls, the behavior of the program may be different in each case even though the same program is being executed. Thus, a generic program may be used in the context of an operational portion of a configuration control.

As a non-limiting example, executable logic may check that the extension of a filename conforms to a desired file extension (e.g., ".txt," ".dat,", etc.), and may be written to check a filename against the desired file extension expressed as a parameter. Parameter(s) 231 may thereby include a parameter for the desired file extension, such that the executable logic will compare a filename provided via user input to the rendered configuration control user interface to the parameter value. Two configuration controls may thereby use the same executable logic to check the file extension, yet may check for different file extensions if they are configured with different values of the file extension parameter utilized by the executable logic.

According to some embodiments, a parameter of parameters 231 may define, at least in part, a subsequent configuration control to present after presentation of configuration control 210. Such a parameter may be given a particular label or otherwise identified so that a system presenting configuration control 210 may be instructed to evaluate this parameter to identify the subsequent configuration control. In some cases, the parameter may have a static value such that presentation of configuration control 210 is always followed by a particular configuration control identified by the parameter's value. In some cases, the parameter may have a value that is dynamically determined such that the resolved parameter value identifies the subsequent configuration control. Such dynamic resolution of the parameter value may be based, at least in part, on an associated configuration template and/or one or more lookup files, in addition to any interpreted expressions to be evaluated within the parameter's value. For example, a first parameter that indicates a subsequent configuration control may include logic that evaluates the current date and additionally reads the value of a second parameter of parameters 231. Based on the value of the second parameter, a lookup file is identified that indicates names of configuration controls, which are looked up by date. The evaluation of the present date then results in selection of a name of a subsequent configuration control, to which the first parameter's value resolves.

As discussed above, an operational portion of a configuration control may have its own scope such that parameters within the operational portion of a first instance of a configuration control may resolve to values independently of parameters within the operational portion of a second instance of the same configuration control. The scope of an operational portion may be lexical (static) or dynamic in nature. When determining the value of a parameter of operational portion 230, any number of other values may be used to perform said evaluation, including: other parameters of the same operational portion, parameters defined within a configuration template used to define the current configuration sequence, parameters returned by one of program(s) 232, parameters defined within an execution environment, or combinations thereof.

Figure 3A:
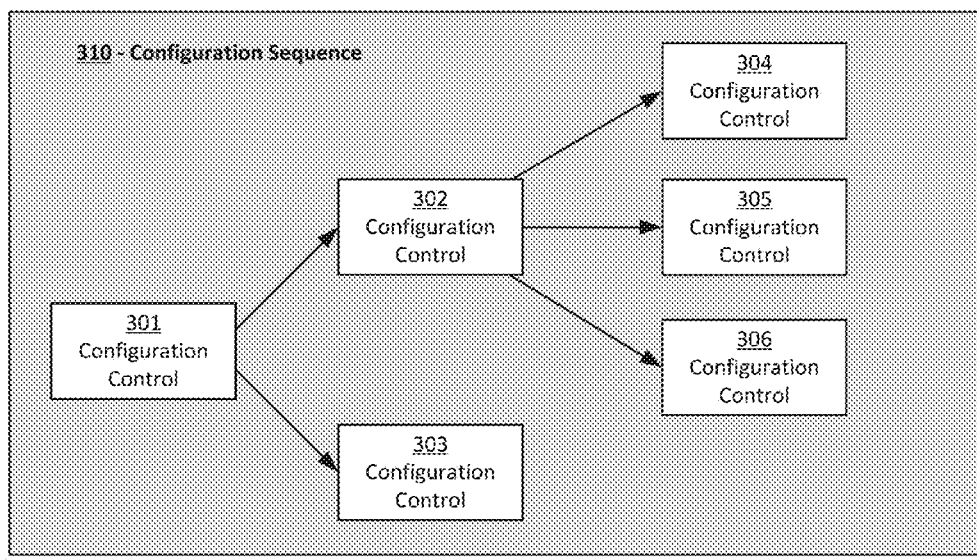
FIGS. 3A-B depict an illustrative use of configuration controls in a sequence, conditionally selected, according to some embodiments.
Figure 3B:
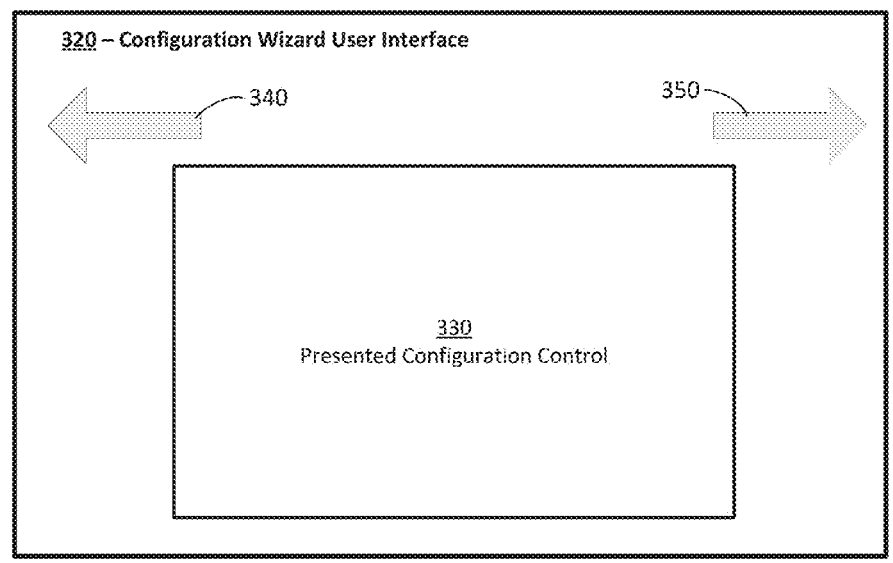

FIGS. 3A-B depict an illustrative use of several configuration controls to configure a generic program based on a sequence, according to some embodiments. As discussed above, a configuration template may define a sequence of configuration controls that may be dynamically presented to a user. In some cases, this sequence may be presented by a program called a "wizard" that may provide additional functionality over and above the presented sequence of configuration controls. The "wizard," for example, may access information—whether as user input, pre-stored data, or information in some other form—and use this information to determine which controls to present in an area. The wizard may also provide data to a selected control to adapt the control to a specific context.

In the example of FIG. 3A, a configuration template defines sequence 310, which includes six configuration controls. This sequence of configuration controls may be presented to a user via a wizard or otherwise. Irrespective of how the sequence is presented to a user, a suitable system (e.g., the system presenting configuration control 110 in method 100) may first present configuration control 301. Subsequently, either configuration control 302 or configuration control 303 is presented to the user. As discussed above, such a decision may be made based on, for example, user input provided by the user to a rendered configuration control user interface of configuration control 301, via one or more lookup files, or combinations thereof.

In the example of FIG. 3A, when configuration control 303 is presented, no further configuration control is presented. This may represent, for example, a use case in which the generic program may be configured based solely on the input provided to configuration controls 301 and 303. Otherwise, if configuration control 302 is presented to a user, either configuration control 304, configuration control 305 or configuration control 306 is subsequently presented. Which of these configuration controls to present may be determined based on user input provided by the user to a rendered configuration control user interface of any of configuration controls 301 and/or 302, or otherwise.

According to some embodiments, a user interface may be presented based on a configuration sequence without the first presented configuration control necessarily being the most upstream configuration control (configuration control 301 in the example of FIG. 3A). For example, a system may present a user interface to a user based on configuration sequence 310 by first presenting configuration control 302 in cases where it is known that configuration control 303 will never be accessed (e.g., in a use case in which the decision outcome for determining which of configuration control 302 and 303 will be chosen is known in advance). Thus, rather than producing a new configuration sequence including only configuration controls 302 and 304-306 configured as shown in FIG. 3A, configuration sequence 310 may be used along with a specification that configuration control 302 is to be the first configuration control presented.

As discussed above, a configuration sequence, such as illustrative configuration sequence 310, may define configuration controls that are presented by a wizard. FIG. 3B depicts an illustrative example of a user interface generated by a system executing a wizard. In this example, the wizard presents configuration controls as defined by a sequence and additionally provides user interface elements for navigating between the configuration controls. Configuration wizard user interface 320 presents a configuration control 330 (e.g., any of configuration controls 301-306 according to configuration sequence 310) and provides navigation buttons 340 and 350 which a user may use to navigate between presented configuration controls. As discussed above in relation to FIG. 1, a user activating a navigation button of a user interface (e.g., by clicking on the button) may initiate a determination of a configuration control to present based on one or more factors.

Configuration wizard user interface 320 may show and/or hide navigation buttons 340 and/or 350 based on the configuration sequence being used. In the example of configuration sequence 310, configuration wizard user interface 320 may hide navigation button 340 during presentation of configuration control 301, since there is no prior configuration control in the defined sequence to which a user might navigate. Similarly, configuration wizard user interface 320 may hide navigation button 350 during presentation of configuration controls 304, 305 or 306 or at any time during the configuration sequence when the wizard has not received sufficient user input or other information to select the next control in the sequence.

According to some embodiments, activation of navigation button 350 may result in a validity check of input provided to the currently presented configuration control 330 (e.g., via the operational portion of the presented configuration control). Such a check may ensure that input is valid before a user proceeds to the next step in the defined sequence. In a case where some aspect of the input is determined to be invalid, the configuration wizard may rather provide an indication to the user that action is required (i.e., entry of valid data) before the next step may be accessed. Additionally, or alternatively, navigation button 350 may be hidden, grayed out or otherwise visibly deactivated until valid data has been provided to a currently presented configuration control.

According to some embodiments, a system presenting configuration wizard user interface 320 may save a state of the configuration wizard that indicates steps previously and/or subsequently taken through an associated configuration sequence. This may allow the navigation buttons 340 and/or 350 to function by accessing this state to determine which configuration control was presented previously or subsequently in the active sequence. For example, if a user navigates through configuration sequence 310 via configuration controls 301, 302 then 305 in that sequence, a state representing that sequence of controls (i.e., 301 to 302 to 305) may be stored. Accordingly, when navigating to the previous step in the active sequence, the state may be read to determine which configuration control should be presented. Once a user has navigated to a previous step, the later steps that were previously visited may be stored to allow a user to return to those steps. For example, in the above illustrative sequence a user may navigate back to configuration control 302, then may wish to navigate forward again. The saved state may allow identification of configuration control 305 as being the subsequent configuration control to present based on these navigational actions.

Figure 4:
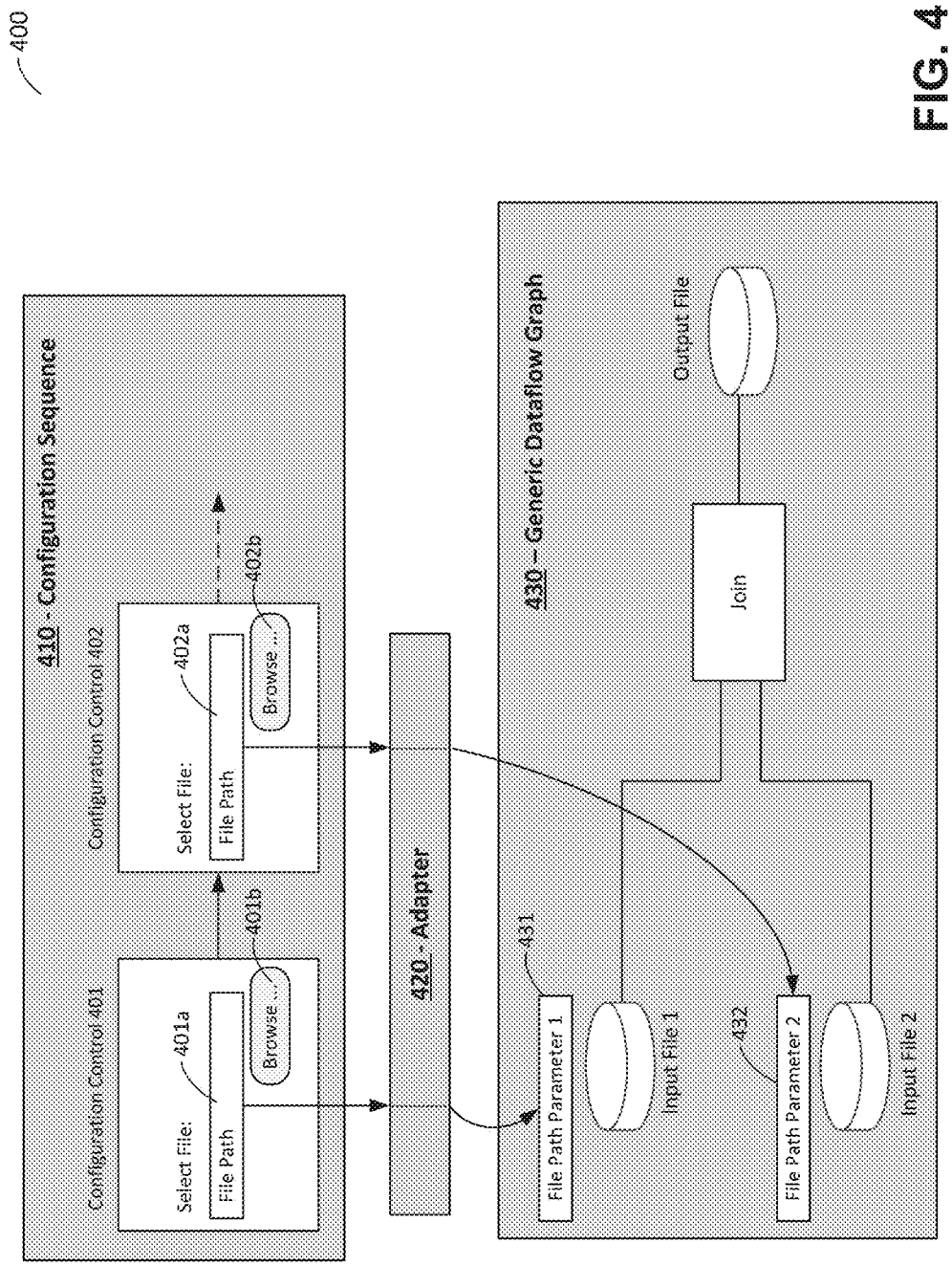
FIG. 4 is a functional block diagram illustrating configuration of a dataflow graph, according to some embodiments.

FIG. 4 depicts a functional block diagram illustrating configuration of a dataflow graph, according to some embodiments. In the example of FIG. 4, a configuration sequence 410 has been defined using configuration controls (which may include using a configuration template as discussed above in relation to FIG. 1) for configuration of generic dataflow graph 430. An adapter 420 provides a mapping between values provided as input to a user interface rendered based on the configuration controls specified by the configuration sequence to parameter values of the generic dataflow graph. Dataflow graphs, and parameter values for dataflow graphs are described in further detail in U.S. Pat. No. 5,966,072, titled "Executing Computations Expressed as Graphs," and in U.S. Pat. No. 7,716,630, titled "Managing Parameters For Graph-Based Computations," both of which are hereby incorporated by reference in their entireties.

In the example of FIG. 4, only the first two steps of configuration sequence 410 are depicted, and it should be appreciated that any number of additional steps may be included (including dynamically determined steps as in the example of FIG. 3A). In the depicted steps, configuration control 401 is used to select a file path corresponding to a first input file ("Input File 1") in the dataflow graph and configuration control 402 is used to select a file path corresponding to a second input file ("Input File 2") in the dataflow graph.

Generic dataflow graph 430 is an illustrative dataflow graph, which in this example shows joining of data from two sources and outputting the joined data to an output file, and is presented merely as one example of a dataflow graph. Generic dataflow graph 430 may be associated with any number of parameter definitions, which configure the graph to receive, store and/or use values for defined parameters, including any number of parameter definitions for each of the four components of the graph ("Input file 1," "Input file 2," "Join" and "Output File") in addition to any number of parameters associated with the graph itself. For the purposes of illustrating the example embodiment shown in FIG. 4, however, only parameters 431 and 432 corresponding to input file paths for the input file components are depicted.

According to some embodiments, configuration controls 401 and 402 may represent the same underlying configuration control, which may be reused in each of the first two steps of configuration sequence 410. Alternatively, configuration controls 401 and 402 may include the same user interface portion but may have different operational portions. In either case, configuration controls 401 and 402 include the same user interface portion, shown in the figure, which enables a user to select a file. The user interface portion includes a text box in which a selected file path is displayed (401a and 402a in configuration controls 401 and 402, respectively) and a "browse" button that, when activated, allows a user to browse a file system for a selected file (401b and 402b in configuration controls 401 and 402, respectively).

Configuration controls 401 and 402 (and further configuration controls used in configuration sequence 410) may be presented to a user in any suitable way, including by rendering the depicted user interface portions in a wizard (e.g., in a configuration wizard user interface as depicted in FIG. 3B). In the example of FIG. 4, configuration control 401 is first presented to a user, which includes rendering the user interface portion of the configuration control as shown in the figure. A user may select a file path via browse button 401b, and the file path of the selected file is shown in text box 401a, as discussed above. This file path is then provided to file path parameter 431 of generic dataflow graph 430 via adapter 420.

As discussed above, an adapter may indicate how values selected within a configuration control's rendered user interface are to be mapped to a generic program's parameters. The adapter may be part of the generic program, part of the configuration template that defines the configuration sequence being performed, or may be a separate component. Irrespective of where the adapter is defined, in the example of FIG. 4A the adapter is configured to map the file path parameter selected during presentation of configuration control 401 to file path parameter 431 in the dataflow graph 430. The user may then proceed (e.g., via a navigation button in a presented configuration wizard user interface) to the next step in configuration sequence 410, wherein configuration control 402 is presented. A file path may be selected via browse button 402b, and the file path of the selected file is shown in text box 402a. This file path is then provided to file path parameter 432 of generic dataflow graph 430 via adapter 420, wherein the adapter is configured to map the file path parameter selected during presentation of configuration control 402 to file path parameter 432 in the dataflow graph. In this way, values of parameters 431 and 432 of the generic dataflow graph 430 may be selected by a user.

As discussed above, configuration control 401 and configuration control 402 may represent the same underlying configuration control. In the example of FIG. 4, therefore, this single configuration control representing a "file selection" configuration activity is reused for two steps of the configuration sequence by providing suitable mappings for each of the two steps via the adapter such that different parameters of the generic dataflow graph are given values in each step. This configuration control may also be used, for example, when selecting a file for the "Output File" component of the generic dataflow graph. In this way, a configuration template may express configuration sequence 410 as including a number of configuration controls, at least some of which may be presented in a dynamically determined sequence.

Figure 5:
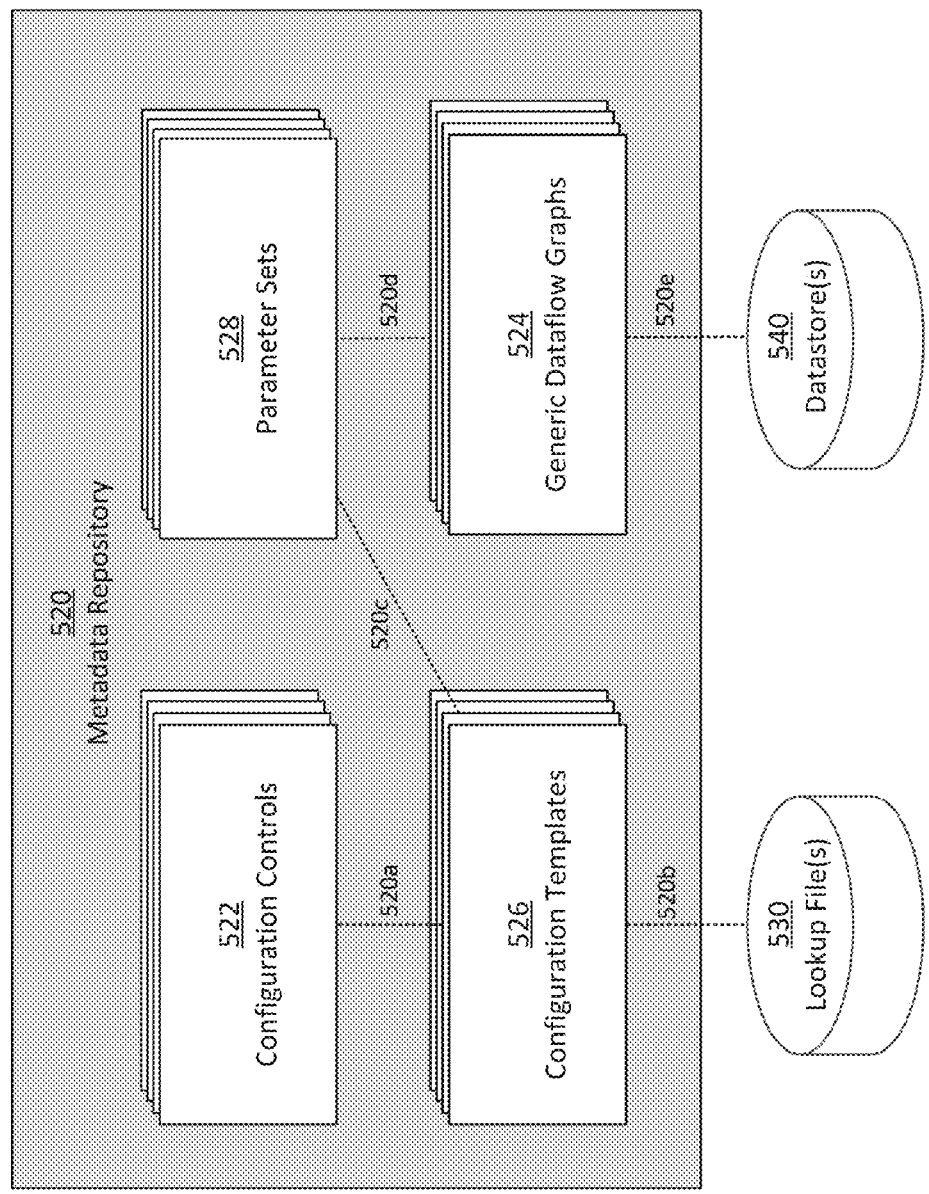
FIG. 5 depicts configuration controls and generic dataflow graphs stored in a metadata repository, according to some embodiments.

FIG. 5 depicts configuration controls and generic dataflow graphs stored in a metadata repository, according to some embodiments. As used herein, a "metadata repository" refers to a datastore configured to store different types of objects in addition to metadata associated with those objects, which may include relational links between objects of the same or different types. For instance, a metadata repository may store a dataflow graph and sets of values of parameters of the dataflow graph, where each set of parameter values has a relational link to the dataflow graph.

According to some embodiments, a metadata repository may include data objects, including configuration controls, dataflow graphs, configuration templates and parameter sets, associations between at least some of these objects, and metadata associated with each object stored in the repository. Metadata repositories are described in further detail in U.S. Pat. No. 7,899,833, titled "Managing Related Data Objects," which is hereby incorporated by reference in its entirety.

While configuration controls and generic programs may generally be stored in any suitable way, system 500 depicts an illustrative embodiment in which configuration controls and generic dataflow graphs are stored in a metadata repository. In addition, configuration templates associated with the generic dataflow graphs are stored in the metadata repository along with parameter sets, representing the product of a process of configuring a generic dataflow graph using an associated configuration template. A generic dataflow graph may be executed using an established parameter set for the graph such that the graph is executed using the parameters defined by the parameter set. Associations between elements shown in FIG. 5 are illustrated by broken lines, and are discussed below. It should be appreciated that storing the illustrated objects may be done by recording the computer instructions and data comprising those objects in memory assigned to the repository. However, a repository may also be complemented by storing links to or other identification of instructions or data. Accordingly, the repository may be implemented in any suitable way.

In the example of FIG. 5, metadata repository 520 includes configuration controls 522 at least some of which are referenced by one or more of configuration templates 526. As discussed above, a configuration template may specify a sequence including one or more configuration controls. Accordingly, a configuration template may be associated with one or more of configuration controls 522. Additionally, each configuration template is associated with a particular one of generic dataflow graphs 524. A single generic dataflow graph may, however, be associated with more than one configuration template if, for example, multiple ways to configure the graph as embodied as different configuration templates are defined. When a generic graph is configured via a configuration template as described herein, the resulting parameters defined for the associated generic graph may be stored in a parameter set. Accordingly, each parameter set is associated with a particular graph.

When a generic graph is executed, one or more datastores 540 may be accessed. Datastores 540 may include number of any type(s) of data sources, including flat files, database tables, database queries, etc. In the example of FIG. 5, data absorbed and produced by execution of a dataflow graph is not stored in the metadata repository, but rather in one or more files on any number of suitable file systems. In addition, in the example of FIG. 5 configuration templates 526 make use of one or more lookup files 530 to determine a configuration control for presentation during a configuration process, as described above.

Figure 6:
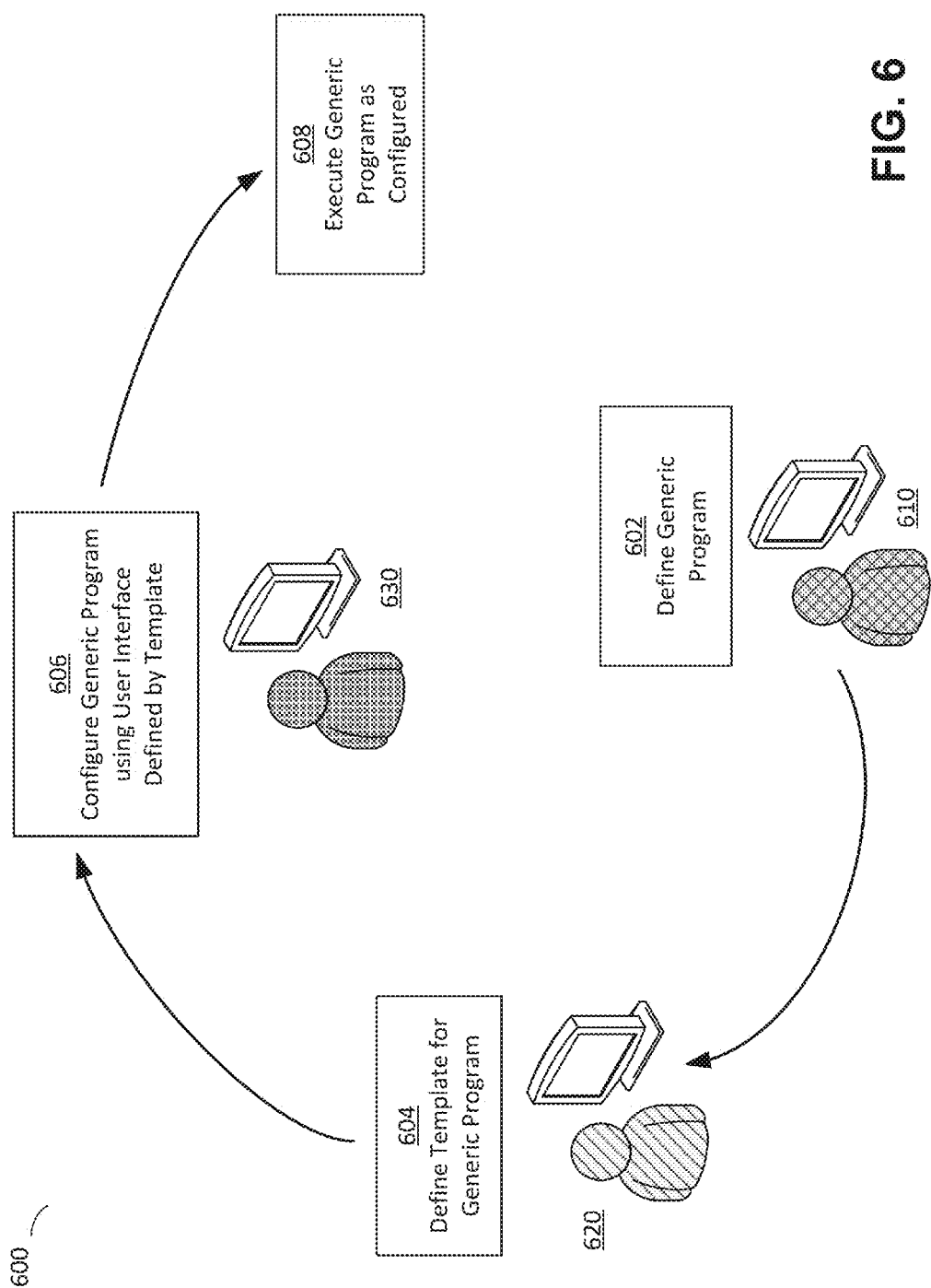
FIG. 6 depicts an illustrative development process for users to configure a generic program according to techniques described herein.

As discussed above, a generic program may be configured by different people, with different skill sets, providing different types of inputs at different times. FIG. 6 depicts an illustrative development process of users configuring a generic program using techniques described herein. In the example of FIG. 6, three users 610, 620 and 630 each perform a step of process 600, namely steps 602, 604 and 606, respectively. These users may be three different people each having a different role (and potentially different skill set) within a business organization. It will be appreciated that in general, however, multiple steps of process 600 may be performed by the same user. For example, steps 602 and 604 may be performed by the same individual.

In step 602, a generic program is defined. User 610 may, in some cases, be a skilled programmer familiar with the particular programming environment in which the generic program is written. For example, in cases where the generic program is a dataflow graph, user 610 may be a user skilled in writing dataflow graphs.

In step 604, a configuration template for the generic program defined in step 602 is defined. User 620 may, in some cases, be a skilled programmer familiar with the particular programming environment in which the configuration template is written. The configuration template may be defined using any suitable application, which may or may not be the same application as was used to define the generic program. The configuration template defines a sequence in which parameters of the generic program may be provided as input. As discussed above, this may include the use of one or more configuration controls and may further include or otherwise access logic for dynamically determining which configuration control to present to a user during configuration of the generic program. Accordingly, user 620 may define such logic (e.g., by defining one or more lookup files). According to some embodiments, users 610 and/or 620 may define an adapter that maps parameter values of the generic program to values provided as input to the user interface defined by the configuration template. Such an adapter may be configured to be part of the configuration template, part of the generic program, or both.

In step 606, the generic program is configured using a user interface defined by the configuration template defined in step 604. User 630 may be a user familiar with requirements of the business, such as a business analyst. The results of the configuration process in step 606 may be that the generic program is immediately executed using the provided parameter values, and/or that the parameter values are stored in any suitable way such that the generic program may be executed at a later time using the values. Irrespective of when it occurs, in step 608, the generic program is executed using the parameter values provided in step 606.

Figure 7:
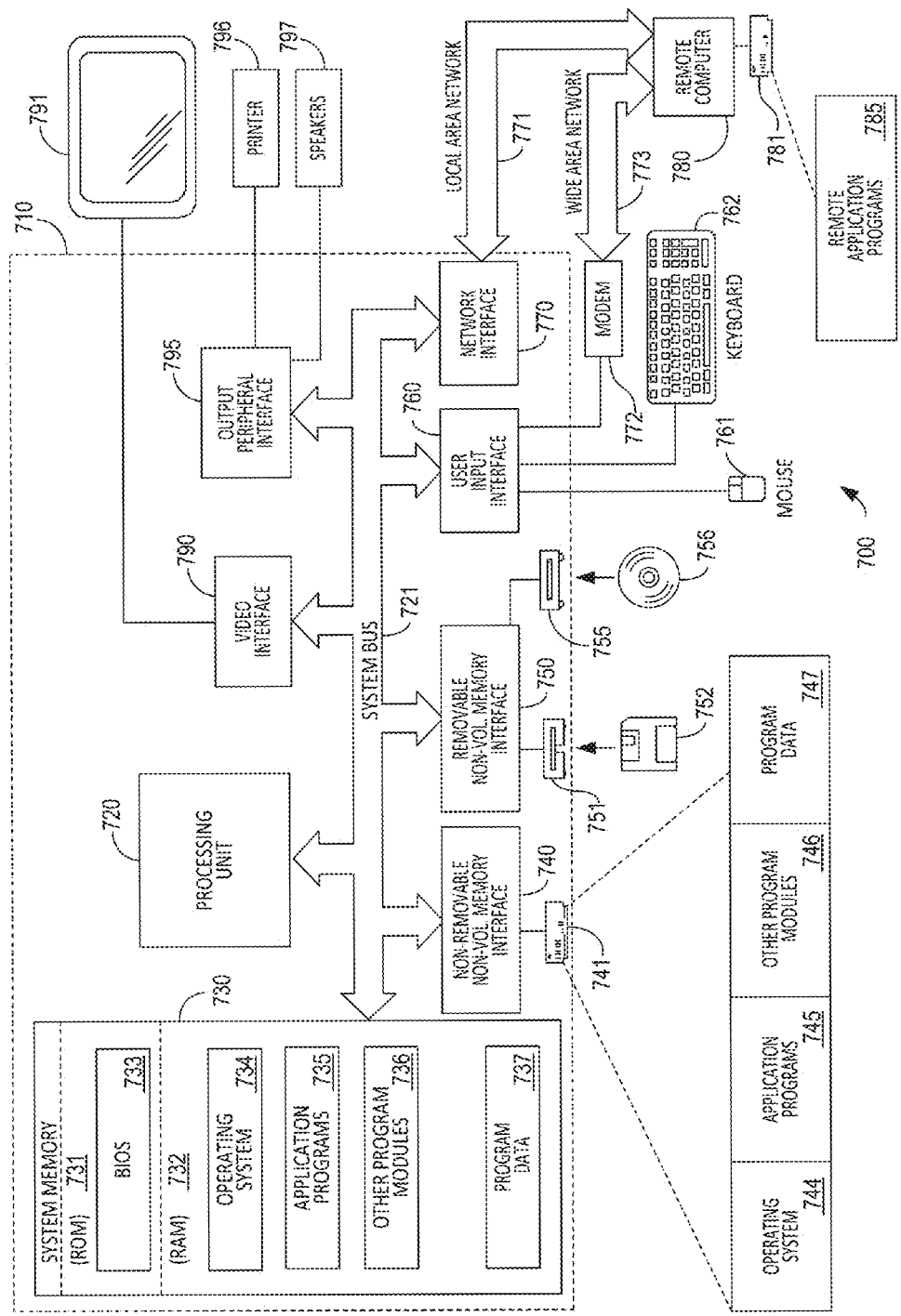
FIG. 7 illustrates an example of a computing system environment on which aspects of the invention may be implemented.

FIG. 7 illustrates an example of a suitable computing system environment 700 on which the technology described herein may be implemented. The computing system environment 700 is only one example of a suitable computing environment and is not intended to suggest any limitation as to the scope of use or functionality of the technology described herein. Neither should the computing environment 700 be interpreted as having any dependency or requirement relating to any one or combination of components illustrated in the exemplary operating environment 700.

The technology described herein is operational with numerous other general purpose or special purpose computing system environments or configurations. Examples of well-known computing systems, environments, and/or configurations that may be suitable for use with the technology described herein include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The computing environment may execute computer-executable instructions, such as program modules. Generally, program modules include routines, programs, objects, components, data structures, etc. that perform particular tasks or implement particular abstract data types. The technology described herein may also be practiced in distributed computing environments where tasks are performed by remote processing devices that are linked through a communications network. In a distributed computing environment, program modules may be located in both local and remote computer storage media including memory storage devices.

With reference to FIG. 7, an exemplary system for implementing the technology described herein includes a general purpose computing device in the form of a computer 710. Components of computer 710 may include, but are not limited to, a processing unit 720, a system memory 730, and a system bus 721 that couples various system components including the system memory to the processing unit 720. The system bus 721 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 710 typically includes a variety of computer readable media. Computer readable media can be any available media that can be accessed by computer 710 and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 710.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 730 includes computer storage media in the form of volatile and/or nonvolatile memory such as read only memory (ROM) 731 and random access memory (RAM) 732. A basic input/output system 733 (BIOS), containing the basic routines that help to transfer information between elements within computer 710, such as during start-up, is typically stored in ROM 731. RAM 732 typically contains data and/or program modules that are immediately accessible to and/or presently being operated on by processing unit 720. By way of example, and not limitation, FIG. 7 illustrates operating system 734, application programs 735, other program modules 736, and program data 737.

The computer 710 may also include other removable/non-removable, volatile/nonvolatile computer storage media. By way of example only, FIG. 7 illustrates a hard disk drive 741 that reads from or writes to non-removable, nonvolatile magnetic media, a magnetic disk drive 751 that reads from or writes to a removable, nonvolatile magnetic disk 752, and an optical disk drive 755 that reads from or writes to a removable, nonvolatile optical disk 756 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 741 is typically connected to the system bus 721 through a non-removable memory interface such as interface 740, and magnetic disk drive 751 and optical disk drive 755 are typically connected to the system bus 721 by a removable memory interface, such as interface 750.

The drives and their associated computer storage media discussed above and illustrated in FIG. 7, provide storage of computer readable instructions, data structures, program modules and other data for the computer 710. In FIG. 7, for example, hard disk drive 741 is illustrated as storing operating system 744, application programs 745, other program modules 746, and program data 747. Note that these components can either be the same as or different from operating system 734, application programs 735, other program modules 736, and program data 737. Operating system 744, application programs 745, other program modules 746, and program data 747 are given different numbers here to illustrate that, at a minimum, they are different copies. A user may enter commands and information into the computer 710 through input devices such as a keyboard 762 and pointing device 761, commonly referred to as a mouse, trackball or touch pad. Other input devices (not shown) may include a microphone, joystick, game pad, satellite dish, scanner, or the like. These and other input devices are often connected to the processing unit 720 through a user input interface 760 that is coupled to the system bus, but may be connected by other interface and bus structures, such as a parallel port, game port or a universal serial bus (USB). A monitor 791 or other type of display device is also connected to the system bus 721 via an interface, such as a video interface 790. In addition to the monitor, computers may also include other peripheral output devices such as speakers 797 and printer 796, which may be connected through an output peripheral interface 795.

The computer 710 may operate in a networked environment using logical connections to one or more remote computers, such as a remote computer 780. The remote computer 780 may be a personal computer, a server, a router, a network PC, a peer device or other common network node, and typically includes many or all of the elements described above relative to the computer 710, although only a memory storage device 781 has been illustrated in FIG. 7. The logical connections depicted in FIG. 7 include a local area network (LAN) 771 and a wide area network (WAN) 773, but may also include other networks. Such networking environments are commonplace in offices, enterprise-wide computer networks, intranets and the Internet.

When used in a LAN networking environment, the computer 710 is connected to the LAN 771 through a network interface or adapter 770. When used in a WAN networking environment, the computer 710 typically includes a modem 772 or other means for establishing communications over the WAN 773, such as the Internet. The modem 772, which may be internal or external, may be connected to the system bus 721 via the user input interface 760, or other appropriate mechanism. In a networked environment, program modules depicted relative to the computer 710, or portions thereof, may be stored in the remote memory storage device. By way of example, and not limitation, FIG. 7 illustrates remote application programs 785 as residing on memory device 781. It will be appreciated that the network connections shown are exemplary and other means of establishing a communications link between the computers may be used.

Having thus described several aspects of at least one embodiment of this invention, it is to be appreciated that various alterations, modifications, and improvements will readily occur to those skilled in the art. For example, systems are described as being implemented with configuration controls. As defined herein the system, and controls, are implemented such that the configuration controls are each defined to perform a task, and can be used at any point in the configuration process where that task is to be performed. Such configuration controls may be adapted, for example, by user input or either data services, for the specific context in which that task is to be performed. It is not a requirement that a configuration controls control be used at multiple places in the configuration process. It also is not a requirement that all of the configuration be performed by such configuration controls. Portions of the process may be performed by controls that perform the same regardless of the context in which they are executed, for example.

Moreover, while controls are discussed herein with applicability to configuration of a generic dataflow graph, it will be appreciated that such controls may be used to configure any suitable generic program. For example, techniques for configuring a generic program as discussed herein may be used to configure a generic program written in any suitable data processing language, or may be used to configure a generic program written in a general purpose programming language, such as Java or C++. Having said that, techniques for configuration of a generic program discussed herein may have particular utility when the generic program is a dataflow graph or other data processing program having a high level of parameterizability.

Such alterations, modifications, and improvements are intended to be part of this disclosure, and are intended to be within the spirit and scope of the invention. Further, though advantages of the present invention are indicated, it should be appreciated that not every embodiment of the technology described herein will include every described advantage. Some embodiments may not implement any features described as advantageous herein and in some instances one or more of the described features may be implemented to achieve further embodiments. Accordingly, the foregoing description and drawings are by way of example only.

The above-described embodiments of the technology described herein can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component, including commercially available integrated circuit components known in the art by names such as CPU chips, GPU chips, microprocessor, microcontroller, or co-processor. Alternatively, a processor may be implemented in custom circuitry, such as an ASIC, or semi-custom circuitry resulting from configuring a programmable logic device. As yet a further alternative, a processor may be a portion of a larger circuit or semiconductor device, whether commercially available, semi-custom or custom. As a specific example, some commercially available microprocessors have multiple cores such that one or a subset of those cores may constitute a processor. Though, a processor may be implemented using circuitry in any suitable format.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the invention may be embodied as a computer readable storage medium (or multiple computer readable media) (e.g., a computer memory, one or more floppy discs, compact discs (CD), optical discs, digital video disks (DVD), magnetic tapes, flash memories, circuit configurations in Field Programmable Gate Arrays or other semiconductor devices, or other tangible computer storage medium) encoded with one or more programs that, when executed on one or more computers or other processors, perform methods that implement the various embodiments of the invention discussed above. As is apparent from the foregoing examples, a computer readable storage medium may retain information for a sufficient time to provide computer-executable instructions in a non-transitory form. Such a computer readable storage medium or media can be transportable, such that the program or programs stored thereon can be loaded onto one or more different computers or other processors to implement various aspects of the present invention as discussed above. As used herein, the term "computer-readable storage medium" encompasses only a non-transitory computer-readable medium that can be considered to be a manufacture (i.e., article of manufacture) or a machine. Alternatively or additionally, the invention may be embodied as a computer readable medium other than a computer-readable storage medium, such as a propagating signal.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Further, some actions are described as taken by a "user." It should be appreciated that a "user" need not be a single individual, and that in some embodiments, actions attributable to a "user" may be performed by a team of individuals and/or an individual in combination with computer-assisted tools or other mechanisms.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A method of operating a data processing system wherein at least one generic computer program parameterized by one or more parameters is configured via a user interface defined at least in part according to a configuration template, the data processing system comprising execution time data and a plurality of configuration controls, including at least a first configuration control and a second configuration control, the first and second configuration controls comprising at least user interface portions and operational portions, the method comprising:
  rendering a first user interface based on the user interface portion of the first configuration control;
  receiving first user input through the first user interface, the first user input providing values for at least one of the one or more parameters for an instance of the at least one generic program;
  identifying the second configuration control by:
    evaluating at least part of the operational portion of the first configuration control, said evaluation being based at least in part on the execution time data; and
    evaluating a portion of the configuration template to identify the second configuration control, the portion of the configuration template being configured to identify one of the plurality of configuration controls based on a result of said evaluating at least part of the operational portion of the first configuration control;
  rendering a second user interface based on the user interface portion of the identified second configuration control; and
  receiving second user input through the second user interface, the second user input providing values for at least one of the one or more parameters for the instance of the at least one generic program.

2. The method of claim 1, further comprising executing the instance of the at least one generic program according to values of the one or more parameters.

3. The method of claim 1, wherein identifying the second configuration control is further based on the configuration template.

4. The method of claim 3, wherein evaluating at least part of the operational portion of the first configuration control based at least in part on the execution time data comprises evaluating at least one parameter of the configuration template.

5. The method of claim 1, wherein evaluating at least part of the operational portion of the first configuration control based at least in part on the execution time data comprises evaluating at least one environment variable.

6. The method of claim 1, wherein the execution time data includes one or more results of executing executable computer program code.

7. The method of claim 1, wherein the at least one generic program is defined by a data processing language.

8. The method of claim 1, wherein the at least one generic program includes a dataflow graph.

9. The method of claim 8, wherein a value of a first parameter of the dataflow graph is determined based on the first user input, and a value of a second parameter of the dataflow graph is determined based on the second user input.

10. The method of claim 9, wherein the value of the first parameter of the dataflow graph is determined based on a predetermined mapping between at least one user interface element of the first user interface and the first parameter of the dataflow graph.

11. The method of claim 1, wherein the at least one generic program includes a subgraph of a dataflow graph.

12. The method of claim 1, wherein identifying the second configuration control is further based on the first user input.

13. The method of claim 1, wherein identifying the second configuration control is further based on a result of performing at least one lookup.

14. The method of claim 1, wherein the operational portion of the first configuration control is evaluated in response to user input provided through the first user interface.

15. A method of defining an interface for configuring at least one generic computer program parameterized by one or more parameters, comprising:
with a computing system, and based at least in part on user input:
associating a first configuration control with the interface, the first configuration control comprising at least an operational portion and a user interface portion that defines a first user interface, the first configuration control configured to define values for at least one of the one or more parameters for the at least one generic program based at least in part on user input received through the first user interface;
associating a second configuration control with the interface, the second configuration control comprising at least an operational portion and a user interface portion that defines a second user interface, the second configuration control configured to define values for at least one of the one or more parameters for the at least one generic program based at least in part on user input received through the second user interface;
associating a third configuration control with the interface, the third configuration control comprising at least an operational portion and a user interface portion that defines a third user interface; and
recording data that, based at least in part upon execution time data and the operational portion of the first configuration control, defines at least one instance in which the user input received through the first user interface is to cause rendering of the second user interface and at least one instance in which the user input received through the first user interface is to instead cause rendering of the third user interface.

16. The method of claim 15, wherein the at least one generic program includes a dataflow graph.

17. The method of claim 16, further comprising, based on user input:
associating a value of a first parameter of the dataflow graph with the first user input, and
associating a value of a second parameter of the dataflow graph with the second user input.

18. The method of claim 16, wherein the one or more parameters are associated with one or more components of the dataflow graph.

19. The method of claim 15, wherein the at least one generic program is defined by a data processing language.

20. The method of claim 15, wherein the at least one program includes a subgraph of a dataflow graph.

21. The method of claim 15, wherein recording data that defines at least one instance in which the user input received through the first user interface is to cause rendering of the second user interface comprises defining at least one lookup file.

22. The method of claim 15, wherein recording data that defines at least one instance in which the user input received through the first user interface is to cause rendering of the second user interface comprises recording data within the operational portion of the first configuration control.

23. The method of claim 15, wherein at least part of the operational portion of the first configuration control is configured to be evaluated in response to user input provided through the first user interface.

* * * * *